US006339594B1

(12) United States Patent
Civanlar et al.

(10) Patent No.: US 6,339,594 B1
(45) Date of Patent: Jan. 15, 2002

(54) WAN-BASED GATEWAY

(75) Inventors: Seyhan Civanlar, Middletown Township, Monmouth County; Don Richard Coffield, Locust; William J. Leighton, III, Scotch Plains; James J. Mansell, Fair Haven; Vikram R. Saksena, Freehold, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/187,351

(22) Filed: Nov. 6, 1998

Related U.S. Application Data

(63) Continuation-in-part of application No. 08/743,784, filed on Nov. 7, 1996, now abandoned.

(51) Int. Cl.$^7$ .............................................. H04L 12/66
(52) U.S. Cl. ...................... 370/352; 370/466; 379/88.17
(58) Field of Search ................... 370/352, 353, 370/401, 465, 466, 467, 522, 410, 384, 377, 354, 355; 379/88.17

(56) References Cited

U.S. PATENT DOCUMENTS

| | | | | |
|---|---|---|---|---|
| 5,204,861 A | * | 4/1993 | Wiebe | |
| 5,278,972 A | | 1/1994 | Baker et al. | |
| 5,351,237 A | | 9/1994 | Shinohara et al. | |
| 5,483,527 A | | 1/1996 | Doshi et al. | |
| 5,521,914 A | | 5/1996 | Mavraganis et al. | |
| 5,604,737 A | | 2/1997 | Iwami et al. | |
| 5,724,355 A | | 3/1998 | Bruno et al. | |
| 5,907,610 A | * | 5/1999 | Onweller | 379/242 |
| 5,915,001 A | * | 6/1999 | Uppaluru | 379/88.22 |
| 5,930,250 A | * | 7/1999 | Klok et al. | 370/352 |
| 6,023,499 A | * | 2/2000 | Mansey et al. | 379/111 |
| 6,067,350 A | * | 5/2000 | Gordon | 370/352 |
| 6,144,670 A | * | 11/2000 | Sponaugle et al. | 370/401 |
| 6,195,357 B1 | * | 2/2001 | Polcyn | 370/401 |
| 6,198,738 B1 | * | 3/2001 | Chang et al. | 370/352 |

FOREIGN PATENT DOCUMENTS

JP  07 170288  12/1993

OTHER PUBLICATIONS

Sutherland, S "B–ISDN Networking" IEEE Communications Magazine, vol. 31, No. 8, Aug. 1, 1993, pp. 60–63.

Tao J et al, "Internet Access via Baseband and Broadband ISDN Gateways" Proceedings of the Annual International Phoenix Conference on Computers and Communications, Phoenix, Apr. 12–15, 1994, pp. 485, 490.

Crowcroft J et al, "Multimedia Teleconferencing over international Packet Switched Networks" IEEE Communications for Distributed Applications and Systems, Chapel Hill, Apr. 18–19, 1991, pp. 23–33.

Mortensen R, "DPBX–LAN Internetworking" Digital Communications, Saskatoon, May 11–12, 1988, IEEE conference May 11, 1998, pp. 6–9.

* cited by examiner

*Primary Examiner*—Douglas Olms
*Assistant Examiner*—Ken Vanderpuye

(57) ABSTRACT

In one embodiment of the invention, an apparatus is provided for establishing a communication session between first and second terminals in communication over a plurality of networks that employ differing transmission standards. The plurality of networks are selected from among a circuit switched network (e.g., a telephony network), a connectionless packet switched network (e.g., the Internet) and a connection-oriented packet switched network (e.g., an ATM or frame relay network). The apparatus includes a call set-up translator for translating among call set-up protocols associated with the circuit switched network, the connectionless packet switched network and the connection-oriented packet switched network. An encoding format translator is provided for translating among encoding protocols associated with the circuit switched network, the connectionless packet switched network and the connection-oriented packet switched network. Also provided is an address database for storing a plurality of addresses in different formats for each registered terminal, which includes the first and second terminals. The apparatus also includes a session manager for storing control information relating to the first and second terminals. The control information includes an identification of the first and second terminals that participate in the communication session.

8 Claims, 5 Drawing Sheets

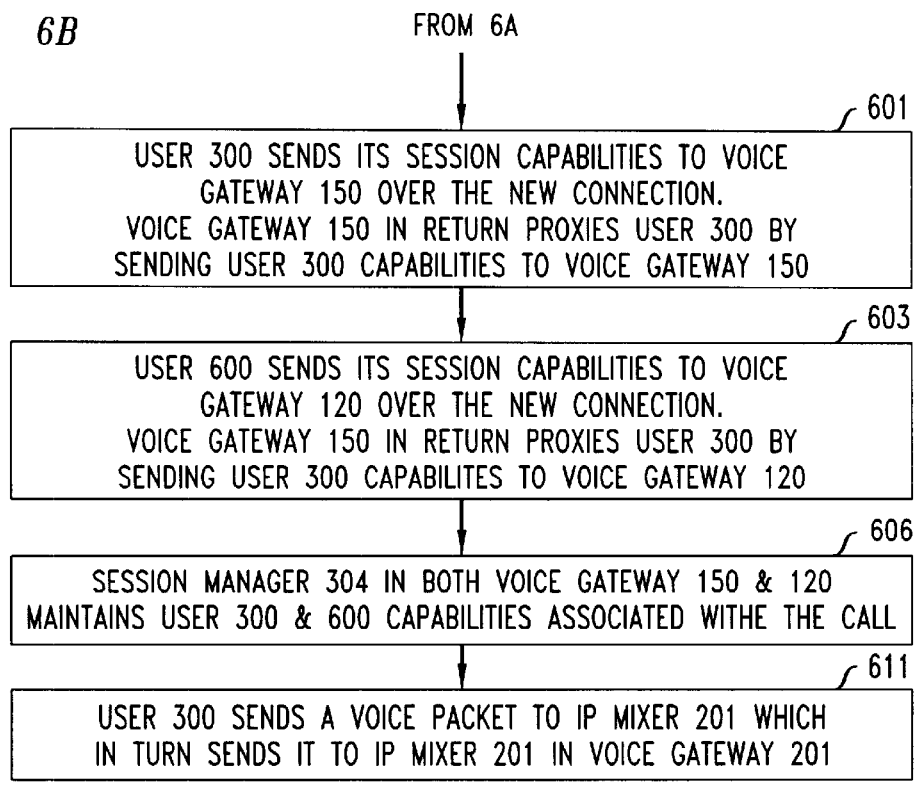
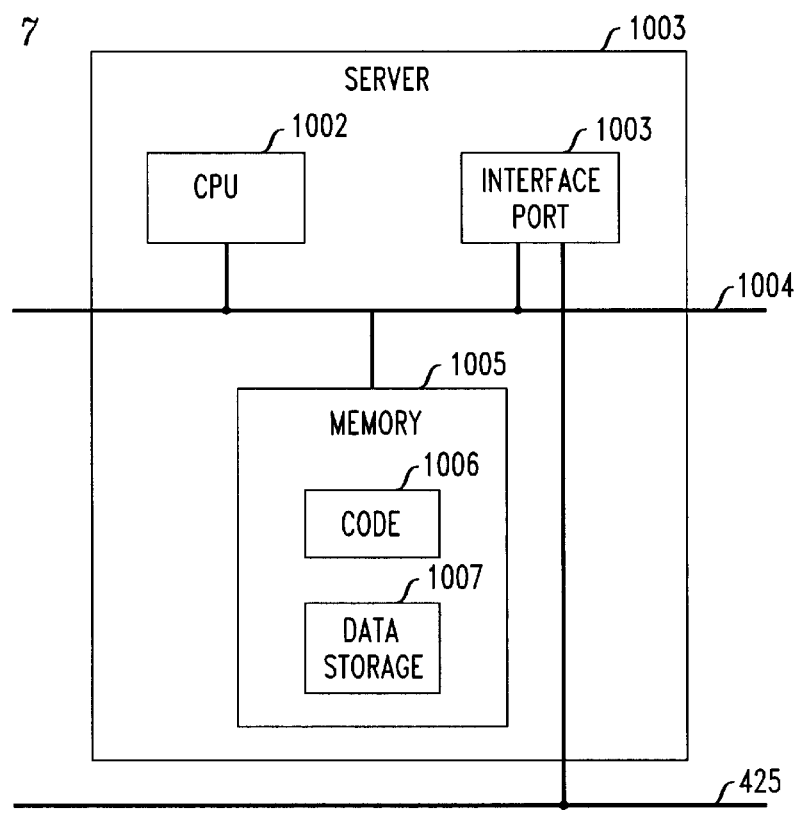

WAN-BASED GATEWAY

REFERENCE TO RELATED APPLICATION

This application is a continuation-in-part application of Ser. No. 08/743,784 filed Nov. 7, 1996, which is hereby incorporated by reference.

TECHNICAL FIELD

This invention relates generally to an apparatus for establishing communication paths over a circuit switched network, a connectionless packet switched network, and a connection-oriented packet switched network, and more particularly to an apparatus for establishing point-to-point or point-to-multipoint audio or video communication over a telephony network, the Internet, and an Asynchronous Transfer Mode (ATM) or a Frame Relay (FR) network.

BACKGROUND OF THE INVENTION

Voice traffic transmitted between two or more users over a telephony network is carried over circuit-switched paths that are established between the users. Circuit-switched technology is well-suited for delay-sensitive, real-time applications such as voice transmission since a dedicated path is established. In a circuit-switched network, all of the bandwidth of the established path is allocated to the voice traffic for the duration of the call.

In contrast to the telephony network, the Internet is an example of a connectionless packet-switched network that is based on the Internet Protocol (IP). While the majority of the traffic carried over the telephony network is voice traffic, the Internet is more suitable to delay-insensitive applications such as the transmission of data. The Internet community has been exploring improvements in IP so that voice can be carried over IP packets without significant performance degradation. For example, the resource reservation protocol known as RSVP (see RSVP Version 2 Functional Specifications, R. Braden, L. Zhang, D. Estrin, Internet Draft 06, 1996) provides a technique for reserving resources (i.e. bandwidth) for the transmission of unicast and multicast data with good scaling and robustness properties. The reserved bandwidth is used to effectively simulate the dedicated bandwidth scheme of circuit-switched networks to transmit delay-sensitive traffic. If RSVP is implemented only for those communications having special Quality of Service (QoS) needs such as minimal delay, the transmission of other communications such as non-real time data packets may be provided to other users of the Internet in the usual best-effort, packet-switched manner.

The majority of Internet users currently access the Internet via slow-speed dial/modem lines using protocols such as SLIP (serial line IP) and PPP (Point to Point Protocol), which run over serial telephone lines (modem and N-ISDN) and carry IP packets. Voice signals are packetized by an audio codec on the user's multimedia PC. The voice packets carry substantial packetization overhead including the headers of PPP, IP, UDP, and RTP, which can be as big as 40 octets. Transmitting voice packets over low speed access lines is almost impossible because of the size of the header relative to the size of a typical voice packet (20–160 octets, based on the average acceptable voice delay and amount of voice compression). However, several proposals have emerged to compress the voice packet headers so that greater transmission efficiency and latency can be achieved for voice-packets transmitted over low-speed, dial access lines.

A substantial number of users is expected to begin sending voice traffic over the Internet with acceptable voice quality and latency because of the availability of RSVP and packet-header compression technologies. The transmission terminals for sending packetized voice over the Internet are likely to be multimedia personal computers.

In addition to the telephony network and the Internet, other transmission standards such as Frame-Relay and ATM have been emerging as alternative transport technologies for integrated voice and data. ATM/FR networks are similar to the telephony network in that they both employ connection-oriented technology. However, unlike the telephony network, ATM/FR networks employ packet switching. In contrast to the Internet Protocol, which is a network layer protocol (layer three), FR and ATM pertain to the data link layer (layer two) of the seven-layer OSI model.

Frame Relay and ATM can transport voice in two different formats within the FR (or ATM) packets (cells). In the first format, the FR (ATM) packets (cells) carry an IP packet (or some other layer-3 packet), which in turn encapsulates the voice packets. Alternatively, the FR (ATM) packets (cells) directly encapsulate the voice packet, i.e., without using IP encapsulation. The first alternative employs protocols such as LAN Emulation (LANE), Classical IP Over ATM, and Multiprotocol Over ATM (MPOA), all of which are well known in the prior art. The second alternative is referred to as "Voice over FR" and "Voice over ATM", respectively. Note that the first alternative, which includes IP encapsulation, allows voice packets to be routed between IP routers. That is, layer-3 processing is performed by the routers along the voice path to determine the next hop router. The second alternative is a purely FR/ATM switched solution. In other words, switching can be performed only at the data link layer. FIG. 1 depicts the protocol stacks for transport of voice over IP and the two alternatives for voice over FR/ATM.

The audio codec depicted in FIG. 1 enables voice encoding/decoding, including voice digitization, compression, silence elimination and formatting. The audio codec is defined by ITU-T standards such as G.711 (PCM of Voice Frequencies), G.722 (7 Khz Audio-Coding within 64 Kbps), G.723 (Dual Rate Speech Code for Multimedia Telecommunications Transmitting at 6.4 and 5.3 Kbps), and G.728 (Speech Encoding at 16 Kbps).

The "Voice over ATM/FR layer" depicted in FIG. 1 is referred to as the multimedia multiplex and synchronization layer, an example of which is defined in ITU-T standard H.222. ITU-T is currently defining the H.323 standard, which specifies point-to-point and multipoint audio-visual communications between terminals (such as PCs) attached to LANs. This standard defines the components of an H.323 system including H.323 terminals, gate-keepers, and multipoint control units (MCUs). PCs that communicate through the Internet can use the H.323 standards for communication with each other on the same LAN or across routed data networks. In addition to H.323, the ITU-T is in the process of defining similar audio-visual component standards for B-ISDN (ATM) in the H.310 standard, and for N-ISDN in the H.320 standard. The previously mentioned standards also define call signaling formats. For example, IP networks use Q.931 call controls over a new ITU-T standard known as H.225 (for H.323 terminals). Telephony networks use Q.931 signaling and ATM networks use Q.2931 signaling.

Many standards bodies are in the process of defining how voice (and video) can be transported within a given homogenous network such as the telephony, IP, FR and ATM networks. However, there is currently no arrangement for transmitting voice over a heterogeneous network that consists of two or more such networks employing different transmission standards.

Summary of the Invention

In accordance with the principles of the invention, the foregoing problem is addressed by employing a gateway which connects to the telephony network, the Internet and the ATM/FR network. Such gating facilities are needed if communication getween users on different networks are to be allowed. The telephony network, Internet and FR/ATM Networks all use different schemes for establishing a voice session (i.e., call set-up protocols), and different formats for controlling a session and transporting voice. The gateway of the present invention provides conversion of the transmission format, control, call signaling and audio stream (and potentially video and data streams) between different transmission standards.

Embodiments of the disclosed gateway provide some or all of the following functions: call-signaling protocol conversion, audio mixing/bridging or generation of composite audio and switching, address registration, address translation, audio format conversion, audio coding translation, session management/control, address translation between different address types, interfacing with other gateways, interfacing with the SS7 signaling network, and interfacing with an Internet signaling network.

The apparatus establishes a communication session between first and second terminals that may be resident in networks that employ differing transmission standards. The different networks may, illustratively, be a circuit switched network (e.g., a telephony network), a connectionless packet switched network (e.g., the Internet) or a connection-oriented packet switched network (e.g., an ATM or frame relay network). The communication session may be an audio session, a video session or a multimedia session.

The apparatus includes a call set-up translator for translating among call set-up protocols associated with the circuit switched network, the connectionless packet switched network and the connection-oriented packet switched network. An encoding format translator is provided for translating among encoding protocols associated with the circuit switched network, the connectionless packet switched network and the connection-oriented packet switched network. Also provided is an address database for storing a plurality of addresses in different formats for each registered terminal, which includes the first and second terminals. The apparatus also includes a session manager for storing control information relating to the first and second terminals. The control information includes an identification of the first and second terminals that participate in the communication session. Participation in a conversation by more than a pair of terminals is easily accommodated by the disclosed gateway.

BRIEF DESCRIPTION OF THE DRAWING

FIG. 7 is a block diagram of one embodiment of the gateway shown in FIGS. 2–4.

DETAILED DESCRIPTION

Figure 1:
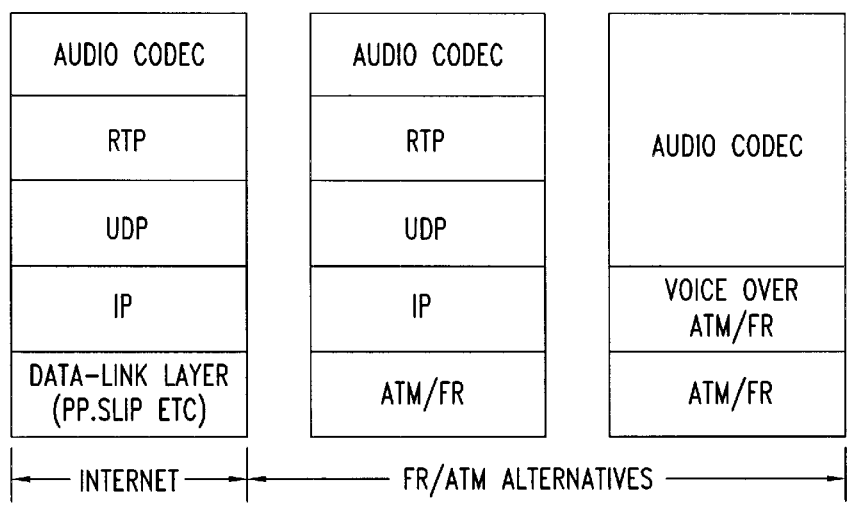
FIG. 1 shows a simplified protocol stack for transporting voice over an IP network, a telephony network (e.g., an ISDN network) and an ATM/FR network.
Figure 2:
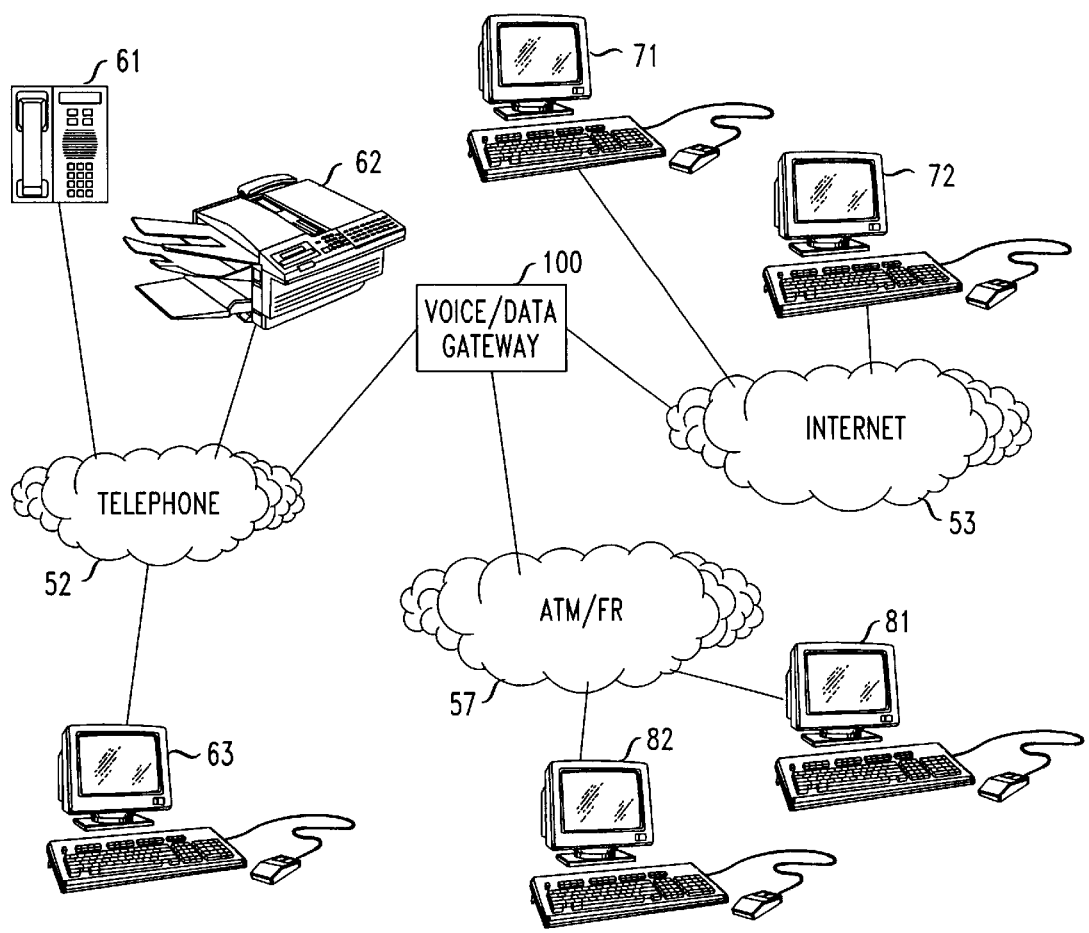
FIG. 2 shows a gateway in accordance with the present invention situated among a telephony network, an IP network and a AM/FR network.

FIG. 2 shows a gateway 100 in accordance with the present invention. As shown, gateway 100 communicates with networks employing differing transmission standards such as telephony network 52, ATM/FR network 57 and Internet 53. Illustratively, gateway 100 is connected to a switch, router or server, and an ATM/FR switch, which are within telephony network 52, Internet network 53, and ATM/FR network 57, respectively. Gateway 100 facilitates voice communication between a variety of end-point stations connected to the individual networks. Such stations may include telephone 61, fax machine/telephone 62, and PC 63 (which are connected to the telephony network 52), PCs 71 and 72 (which are connected to the Internet 53) and workstations 81 and 82 (which are connected to the ATM/FR network 57).

Figure 4:
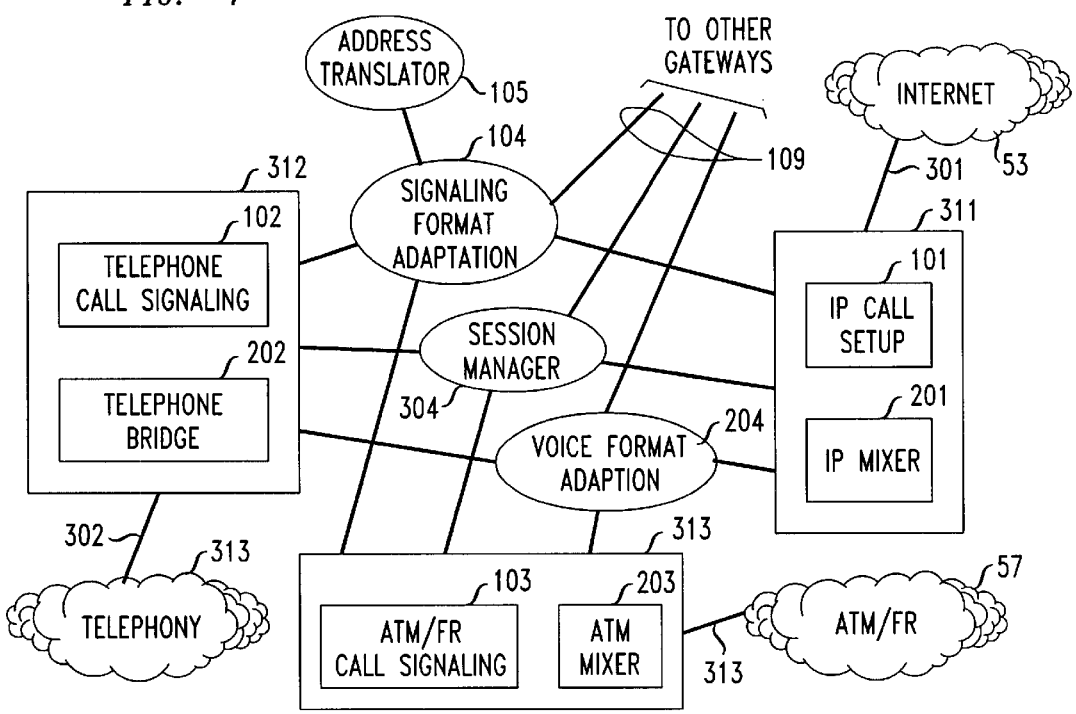
FIG. 4 shows a simplified diagram of a gateway interconnected with various networks.

An illustrative functional embodiment of gateway 100 in conformance with FIG. 2 is presented in FIG. 4. Networks 52, 53, and 57, are three different networks that are connected to gateway 100. Network 52 is the conventional, well known, telephone network, network 53 is an internet network, and network 57 is an ATM/Frame Relay network. This, of course, is merely illustrative, and it should be appreciated that any number of networks can be coupled to gateway 100, that not all of the networks must be different from each other, and that the illustrated set of types of networks is not exhaustive.

Each network that connects to gateway 100 has an interface block. Thus, gateway 100 in FIG. 4 has an interface bus 301 for connecting Internet network 53 to interface block 311, an interface bus 302 for connecting telephony network 52 to interface block 312, and an interface bus 303 for connecting ATM/FR network 57 to interface block 313. Within network interface 311 there is an IP call setup module 101 and an IP mixer 201. Within network interface 312 there is a telephony call signaling module 102 and a telephony bridge 202. Within network interface 313 there is an ATM/FR call signaling module 103 and an ATM mixer 203. Each one of the interfaces (311, 312, and 313) is connected to a signaling format adaptation module 104, to a voice format adaptation module 204, and to session manager 304. Thus, module 104 handles the signaling handled among the network interfaces (311, 312, and 313); module 204 handles communication (e.g. conversation) signals flowing among the network interfaces; and session manager handles session managing needs of conversations passing through gateway 100. In the context of this disclosure, a session corresponds to the activities that set-up a call, that carry on communication, and that tear-down a call.

A number of different approaches can be taken for handling the signal formats between interfaces 311, 312, and 313 on the one hand, and processing elements 104, 204, and 304, on the other. One approach is to allow interfaces 311, 312, and 313 to operate in formats that are native to the networks with which they interface. For example, signals between the core elements (elements 104, 204, and 304) and interface 311 may be in a format acceptable to IP network 53, signals between the core elements and interface 312 may be in a format acceptable to telephony network 52, and signals between the core elements and interface 313 may be in a format acceptable to ATM/FR network 57. Another approach is to employ a chosen, generic, format and have all interfaces (elements 311, 312, and 313) interact with the core elements in that generic format. Of course, all functions and other conversions that need to be performed by the gateway are carried out by the core elements or the interface elements. The division of labor between the core elements and the interfaces is a matter of designer choice.

Interface 311 includes an IP call setup unit 101 and an IP mixer 201, interface 312 includes telephony signaling unit 102 and telephone bridge 202, and interface 313 includes ATM/RF call signaling unit 103 and ATM Mixer 203. Units 101, 102, and 103 are involved in establishing calls, and units 201, 202, and 203 are involved in combining voice signals.

When an IP station in network 53 wishes to establish a call, for example with a conventional POTS telephone in network 52, it sends an appropriate signaling packet to its Internet Service Provider (ISP). That signaling packet eventually arrives at unit 101, and unit 101 determines that the packet wishes to establish service with a particular POTS telephone. Element 104 determines the POTS phone number of the called party, and forwards a call set up request to unit 102. The POTS number is determined either from the signaling packet, or packets, of the IP station, or with the aid of database 105 which is coupled to element 104. For example, the IP station may specify the called party in terms of an IP address. Database 105 would then translate the IP address to the format desired by network 52. Most simply, unit 102 is coupled to a central office and simply dials out the called party's number using DTMF signals. In such a case, the called phone number has the familiar 1, area code, exchange, number format. Alternatively, unit 102 can be constructed to possess some of the capabilities that are found in a central office, such as the ability to consult with the SS7 signaling network and to proceed with the call establishment if a line is available. In such an embodiment, unit 102 interfaces with network 52 in the format that is acceptable to network 52, for example Q.931, and it includes circuitry to interact with the SS7 network. Such circuitry generates SS7 signaling messages to a Network Control Point (NCP) to obtain, for example, a telephone number translation prior to generating an outgoing Q.931 signaling message to the telephony network 52

In the course of sending information from unit 101 to unit 104, and then to unit 102, some signal conversion must necessarily occur. As indicated above, this can occur by unit 101 converting the information in the signaling pocket(s) to information formatted in a selected generic format. In such a case, unit 104 accepts the information in the generic format, performs its analysis, forwards the necessary information to unit 102 in the same generic format, and unit 102 converts the information to a format that is suitable for telephony network 52. Alternatively, unit 101 sends information in IP format to unit 104, unit 104 ascertains what that information is, formats the necessary information into a format acceptable to unit 102 (e.g. DTMF, or Q.931), and forwards the formatted information to unit 102. Element 101 also monitors the status of each call establishment session and transmits error messages as appropriate (in the form of audio messages or digital data) to the IP station, as necessary.

A similar interaction occurs when an IP station wishes to establish a connection with a station in network 57, except that unit 103 is involved rather than unit 102 (and the format might be Q.2931). Also, a similar interaction occurs when a station in some other network wishes to establish communication with a station in IP network 53. For example, if a POTS telephone wishes to call a station in network 53, it dials out the called number. The SS7 network identifies the called number as one that must be accessed through gateway 100 and if a path is available, the calling party is connected to interface 312 and the called party number is provided to unit 102. Unit 102 sends the necessary information to signaling format adaptation unit 104 which, with the aid of database 105, converts the dialed phone number into an IP address of the called party (IP station). The necessary information is then forwarded to unit 101, which sends a call establishment packet, or packets, to the called IP station.

For sake of simplicity, the following descriptions relate to an embodiment where signals between interface 311 and the core elements are in IP format, signals between interface 312 and the core elements are in telephony format, and signals between interface 313 and the core elements are in ATM/FR format.

As can be surmised from the above, signaling format adaptation block 104 is a signaling format translator. It translates the call-setup requests from the form with which such requests arrive into a form that the destination interface can properly understand. For example, it generates the information that Q.931 signals need if network 52 is the destination, the information that IP packets need if network 53 is the destination, and/or the information that Q.2931 signals need if network 57 is the destination. It also effects number translations with the aid of database 105.

Mixer 201 is needed for the occasions when more than one IP terminal participates in the communication. When one IP terminal communicates with, for example, a POTS telephone, the IP terminal encodes the speech in accordance with a particular algorithm and transmits the resulting digital data in IP packet format. The stream of IP packets of that terminal is applied to voice format adaptation block 204, wherein the encoded speech contained in the packet is decoded and converted to the format needed for the POTS telephone. Conversely, information destined to that IP terminal comes from block 204 already formatted in IP format and in the speech encoding that is suitable for the IP terminal. However, when two or more IP terminals are involved, the situation is more complicated. This is particularly so when the IP terminals that participate in the connection employ different speech encoding algorithms. On the side going to other networks, it is the function of mixer 201 to process incoming packet streams and to create a single packet stream that represents the combined speech signal of the IP terminals that participate in the communication. That IP packet stream is applied to element 204, and element 204 converts it to the speech signal format of either interface 312 or interface 313, as appropriate. In the other direction, signals that reach mixer 201 from element 204 and are destined to more than one IP terminal have to be converted to a number of individual IP streams, addressed to the appropriate individual IP terminals. Mixer 201 performs this "demultiplexing" and also insures that each of the IP terminals receives a signal that is encoded in the proper speech encoding algorithm, for example, 16 Kpbs speech encoding (standard G.728) for one IP terminal, and 64 Kbps speech encoding (standard G.722) for another IP terminal. The speech encoding translations are performed in mixer 201 pursuant to information provided to IP mixer 201 by session manager 304.

In some embodiments of the invention, the IP packet mixer 201 also provides control functionality that would otherwise be performed by IP call set-up interface 101. In particular, IP packet mixer 201 performs such control functions when in-band signaling is employed. If out-of-band signaling is employed, the control functions may conveniently reside in IP call set-up interface 101. In the former situation the IP packet mixer receives control packets over an IP connection such as a dedicated UDP or TCP socket interface, for example. The control packets identify the control information pertaining to the station from which it receives the packet, such as the type of voice encoding that is employed by the station, bandwidth utilization, and Quality-of-Service (QoS) requirements. A QoS requirement relates to a measure of goodness of a service connection. In packet-routing networks, it may relate to the probability of lost packets. Of course, if no control information is provided, previously defined default control parameters may be used. IP packet mixer 201 is also used by an IP station to terminate its participation in a session. The session control information received by the IP packet mixer 201 is forwarded to the session manager 304 to maintain a current database of station requirements.

Voice bridge 202 serves a function that parallels the function of mixer 201, except that it concerns itself with multiple session participants from network 52. For example, when more than one voice instrument from network 52 participates in a communication, voice bridge 202 combines the two signals to form a single signal that represents the combination. Likewise, ATM mixer 203 concerns itself with multiple participants from network 57. As an aside, bridge 202 can be an analog bridge when the incoming signals are analog. It can also be digital, if incoming signals are digital or conversion to digital precedes the bridge.

Voice format adaptation block 204 is a speech format translator. It translates incoming speech that arrives in one particular format and speech encoding standard into a format and speech encoding standard that the destination terminal is adapted to accept. Voice format interface 204 also performs appropriate de-encapsulation (if the incoming signal is from interface 313), protocol conversion, echo cancellation, encryption, packetization, etc., before the digitized voice is sent to the IP mixer 201 and/or the ATM/FR mixer 203 for subsequent forwarding.

Address translator 105 is provided to various stations to register using various address formats, such as email address, IP address, E.164 address, MAC address and/or ATM NSAP address formats, etc. This allows element 104 to translate addresses from one address format to another.

Session manager interface 304 is employed to receive control information from the mixers, bridges and call set-up interfaces which pertains to the capabilities and status of those stations participating in the communication session. Session manager interface 304 assists the IP mixer 201, telephony bridge 202 and FR/ATM mixer 203 in forwarding voice traffic to all participating stations.

In an initial, commercial, introduction of the gateway disclosed herein, it is possible that a telecommunications services provider may find that a single gateway will suffice. However, most telecommunications services providers own networks that span a large geographic area, and the different types of networks that they own have roughly the same geographic footprint. Since most subscribers make most of their calls to subscribers that are geographically close, it is quite possible that even in an initial introduction of the gateway disclosed herein, the telecommunications services provider will find it advantageous to employ more than one gateway. In accordance with the principles of this invention, when more than one gateway is used it may be found advantageous to interconnect these gateways in a wide area network (WAN). In this manner, calls from a terminal in one type of network to a terminal in another type of network would pass through one gateway, or perhaps through more than one gateway, based on the geographic distance between the calling and called parties. More specifically, under normal circumstances it is expected that when the distance is short, only one gateway would be employed. When the distance is large, two or more gateways would be employed. It may be noted in passing that use of the term WAN does not intend to suggest any particular network arrangement, because any network that interconnects geographically disperse gateways will do. This includes hierarchical and not hierarchical networks, fault tolerant and non-fault tolerant networks, etc.

Figure 3:
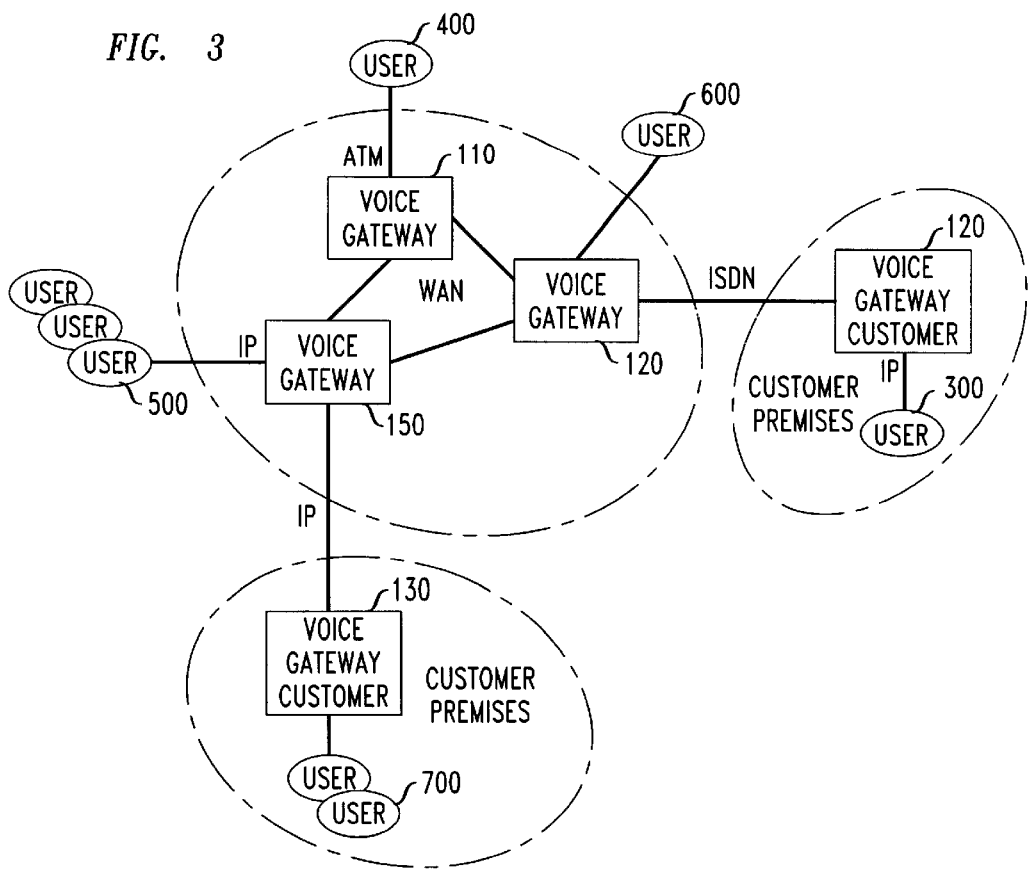
FIG. 3 shows a plurality of gateways interfacing with one another and with user terminals.

FIG. 3 illustrates one arrangement of a WAN which, in a sense, is a hierarchical network. It includes gateways 150, 110, and 120 which are connected to each other and which make up the highest level in the hierarchical structure. A lower level is also shown, and it comprises gateways 130 and 140. The arrangement illustrated in FIG. 3 does not show a direct connection between gateways 130 and 140 but such a connection may be permitted. As depicted, the FIG. 3 network can be also thought to comprise "master" gateways 100, 110, and 120, and "slave" gateways 130 and 140.

Each of the gateways, whether a master gateway or a slave gateway, can support subscribers from one or more diverse networks. The gateways for the FIG. 3 arrangement can be replicas of the FIG. 4 gateway, except that those gateways that support subscribers from less that all of the different networks can be constructed with fewer components. Illustratively, if the three networks that are shown in FIG. 2 constitute all of the different network to be served, and one of the gateways supports only customers from one, or perhaps two of the networks then, of course, that gateway may be constructed with fewer than all of the elements shown in FIG. 4.

Bus 109 in FIG. 4, which carries signals from elements 104, 204 and 304, is the bus that is used to couple gateways to each other. The format of the signals that bus 109 carries is a matter for designer's choice. Certainly, it should permit any possibly of connections. Perhaps the most challenging connection occurs when a conference call is conducted with six participant (in the context of the three diverse networks of FIG. 2), where two gateways are involved, and each gateway services one subscriber in each of the three diverse networks. Given some thought, it becomes apparent that in such a connection, bus 109 cannot simply employ the signal format of the network from which a subscriber calls (i.e. choose to not make any conversion). Some conversions must be made. This, however, does not dictate that some format be fixedly selected. The format employed on bus 109 may be the format of one of the networks, may be some generic format that is a super-set of the other three formats, may be the format of the first subscriber that initiates the conference call, etc.

Figure 5:
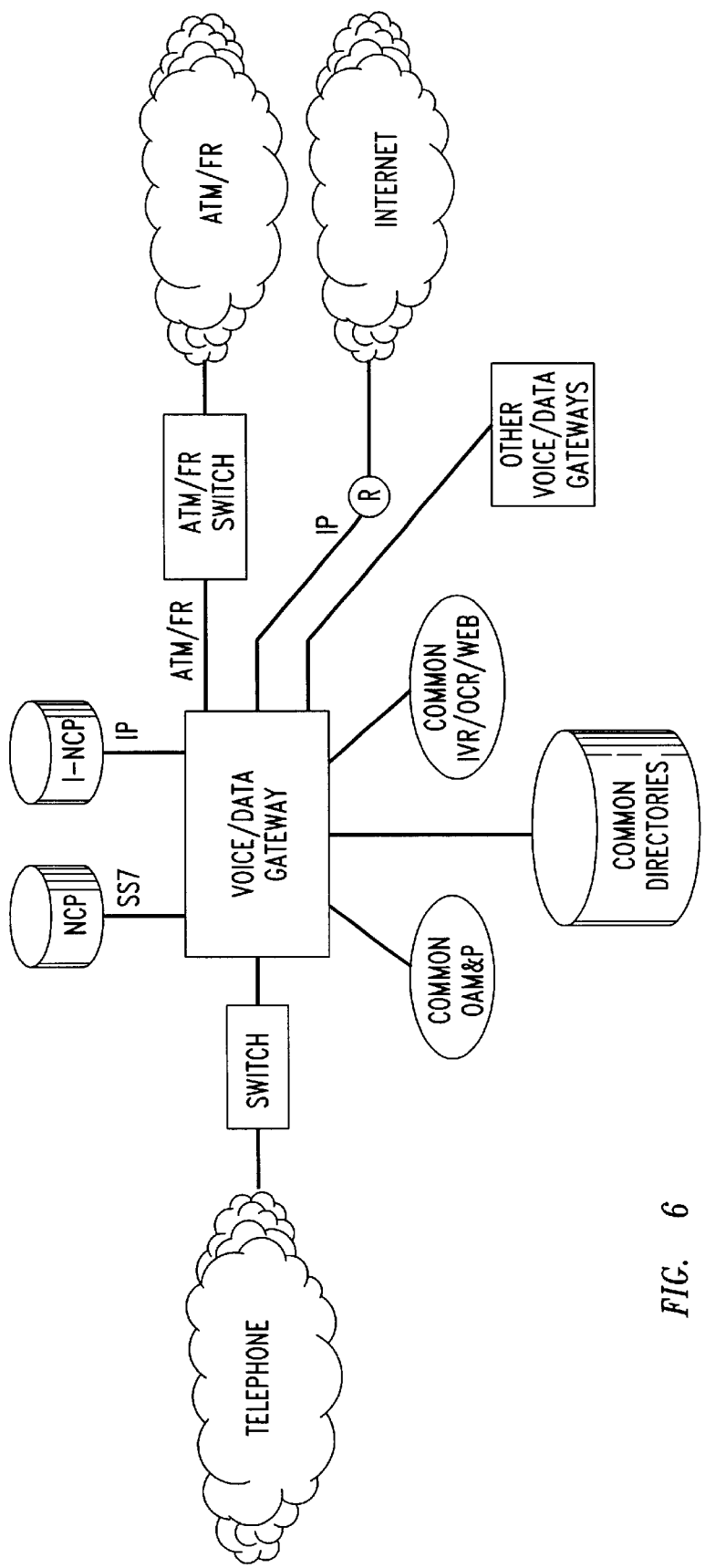
FIG. 5 is a block diagram showing the functionality of various interfaces of which the gateway is comprised.

As illustrated in FIG. 5 gateway 100 also connects to various common Operations Administration Management and Provisioning (OAM&P) functions, databases/directories (e.g., authentication databases such as for credit card authorization), and signaling network intelligence that reside within the SS7 signaling network such as a network control point (NCP) and an Internet NCP residing within the Internet. For example, an NCP may be used by the telephony call set-up interface 102 to translate an 800 number into a telephone number. Similarly, an Internet NCP may be used by the IP call set-up interface 101 to request a translation of a station's email address, host name, or URL to an IP. The Internet NCPs provide intelligent services, such as discussed in U.S. application Ser. No. 08/618,483.

Figure 6:
FIG. 6 shows a flow chart of an exemplary method for processing calls through the gateway in accordance with the present invention.
Figure 6A:
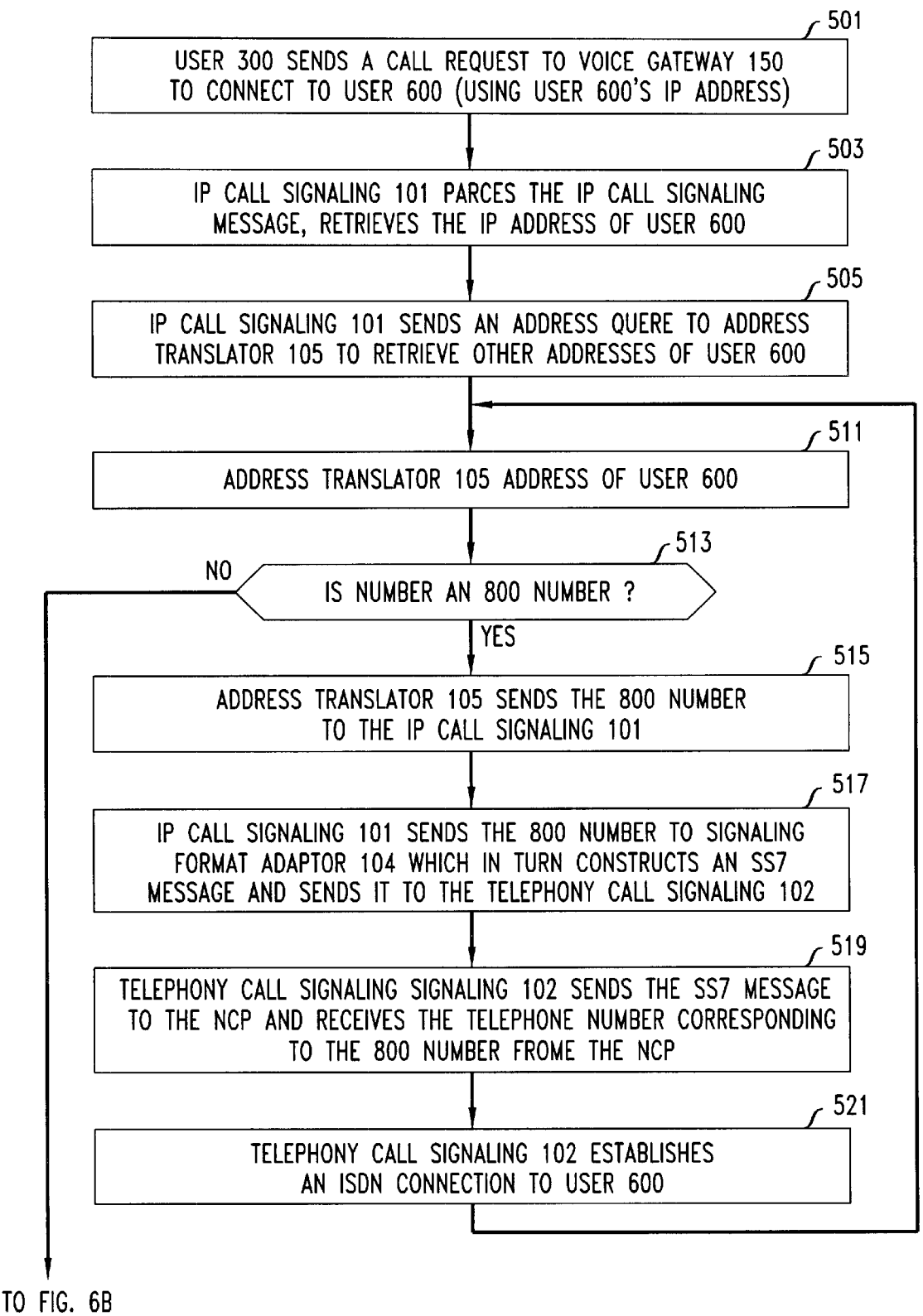

FIG. 6 shows a flow chart of an exemplary method for establishing a voice session between user stations 300 and 600 of FIG. 3. Station 300 is an IP station and is provided with direct connectivity to the gateway 150. Station 600 is an ISDN station, and it communicates with the gateway 120. The method begins at step 501 when station 300 sends a call signaling request over the Internet to gateway 150 in the form of an IP packet. The IP packet carries signaling information (e.g., in the form of a Q.931 message), including the IP address of the called station 600. Within gateway 150, station 600 is connected to interface 301.

In step 503,. IP call set-up interface 101 parses the IP packet, retrieves the IP address of station 600 and communicates that information to element 104. In step 505, element 104 sends an address query to the address translator 105 to retrieve another address for station 600. In step 511 element 105 retrieves an address for station 600, normally in the format of the network in which station 600 resides. Of course, knowing the network address of station 600 is insufficient to inform the arrangement of which gateway is best to use in order to reach station 600. Element 105 may have a single designated gateway for station 600, or it may have a list of gateways arranged in order of priority. Element 105 may also include an associated means (e.g. a processor) for dynamically choosing a gateway for station 600; for example, based on traffic conditions in the various telecommunication networks. In other words, the Wide Area Network can employ almost any of the routing techniques that are currently known.

It is also possible that station 600 is known to others by an 800 number. In such a case, it may be advantageous to design the gateway so that element 105 informs element 104 of the fact that the number sought to be translated is an 800 number, and provides to element 104 the 800 number in an appropriate format. This information is sent to element 102, which interacts with an appropriate database outside the gateway to obtain a proper translation. Of course, one can have a plurality of 800 number-translation databases outside the gateway, and in different formats; in which case, the outputs of database 105 might be different. To account for the above, following step 511, conditional branch point 513 determines whether address translator 105 returned an 800 number for station 600.

If the result in step 513 is NO, then the information provided by database 105 reveals the gateway through which it is best to reach station 600; which in the illustrative example is gateway 120. Control then passes to step 601 (FIG. 6B). Otherwise, control passes to step 515.

If the result in step 513 is YES, indicating that station 600 was requested by dialing an 800 number, address translator interface 105 sends the 800 number to the IP call set-up interface 101 of gateway 150 in step 515. In step 517, IP set-up interface 101 of gateway 150 sends the 800 number to the signaling format interface 104, which in turn constructs an SS7 message and forwards it to the telephony call set-up interface 102. In step 519, the interface 102 sends the SS7 message to the NCP in the signaling network to translate the 800 number into a telephone number. The NCP provides the requested telephone number to the telephony call set-up interface 102.

Once the proper telephone number is determined, in step 521 interface 102 provides that information to element 104. Once element 104 obtains the translated number, control returns to step 511 where database 104 is asked to translate the number and to identify the gateway to be employed. Control then passes to step 513, from which control passes this time to step 601.

Connection to station 600 is then effected and, once the station 600 is connected across the Telephony Bridge 202 and IP Mixer 201, a "connection negotiation" is established between the users 300 and 600 in steps 601 and 603 to indicate their respective audio encoding preferences, say G.711 for station 300 and G.723 for station 600. Note that gateway 150 needs to know the encoding preferences of station 300 while gateway 120 needs to know the encoding preferences of station 600. Once the station capabilities and preferences are known to each gateway, in step 605 the session managers 304 in both gateways 150 and 120 store a conference table that includes the preferences of both users. Communication proceeds between stations 300 and 600 in step 611 when station 300 sends a voice packet to the IP mixer 201 in gateway 150, which in turn sends the packet to the IP mixer 201 in gateway 120.

The method described above in connection with FIG. 6 may be implemented in a similar manner if station 600 is an ISDN terminal that employs voice over ISDN without implementing the Internet protocol.

FIG. 7 is a block diagram of an exemplary embodiment of WAN-based gateway 1001 which includes a) central processing unit (CPU) 1002, b) interface port 1003 c) data bus 1004 and d) memory 1005. Central processing unit (CPU) 1002 provides the computational capability necessary to control the processes of gateway 1001.

Data bus 1004 provides for the exchange of data between the components of gateway 1001.

Interface port 1003 provides for the exchange of data between gateway 1001 and devices external to Gateway 1001 via link high speed backbone 425.

To this end, interface port 1003 contains, for example, well-known data transceivers.

Memory 1005 includes 1) code portion 1006, which contains the instructions (program) used by CPU 1002 to control the processes of Gateway 1001, such as those described herein above, and data storage portion 1007, which contains the information necessary to the gateway to perform its specific function, such as, address registration and translation.

The foregoing merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. A method for establishing a communication session between at least a first terminal in a first network and a second terminal in a second network, where said first network and said second network are members of a set of networks that employ differing transmission standards, said set of networks including a circuit switched network, a connectionless packet switched network and a connection-oriented packet switched network, said method comprising the steps of:

receiving a call set-up request from said first terminal in accordance with a call set-up protocol associated with said first network, said call set-up request specifying said second terminal;

ascertaining said second network and identifying type of said second network, the type being one of the types of networks that belong to said set of networks;

translating said call set-up request into a call set-up signal in conformance with a protocol associated with said second network;

translating information received from said first terminal from a first encoding format to a second encoding format;

transmitting said information in the second encoding format to the second terminal;

storing control information relating to the first and second terminals, said control information including an identification of the first and second terminals participating in the communication session.

2. The method of claim 1 wherein the step of translating said call set-up request includes the step of retrieving at least one address from an address database of said second terminal in a format different from a format in which it is received from the first terminal.

3. The method of claim 1 wherein said control information includes dynamically alterable control information.

4. The method of claim 3 wherein said dynamically alterable control information includes data formats.

5. The method of claim 3 wherein said dynamically alterable control information includes encoding formats.

6. The method of claim 1 wherein said circuit-switched network is a telephony network.

7. The method of claim 1 wherein said connectionless packet switched network is the Internet.

8. The method of claim 1 wherein said connection-oriented packet switched network is an ATM network.

* * * * *